United States Patent Office 3,421,124
Patented Jan. 7, 1969

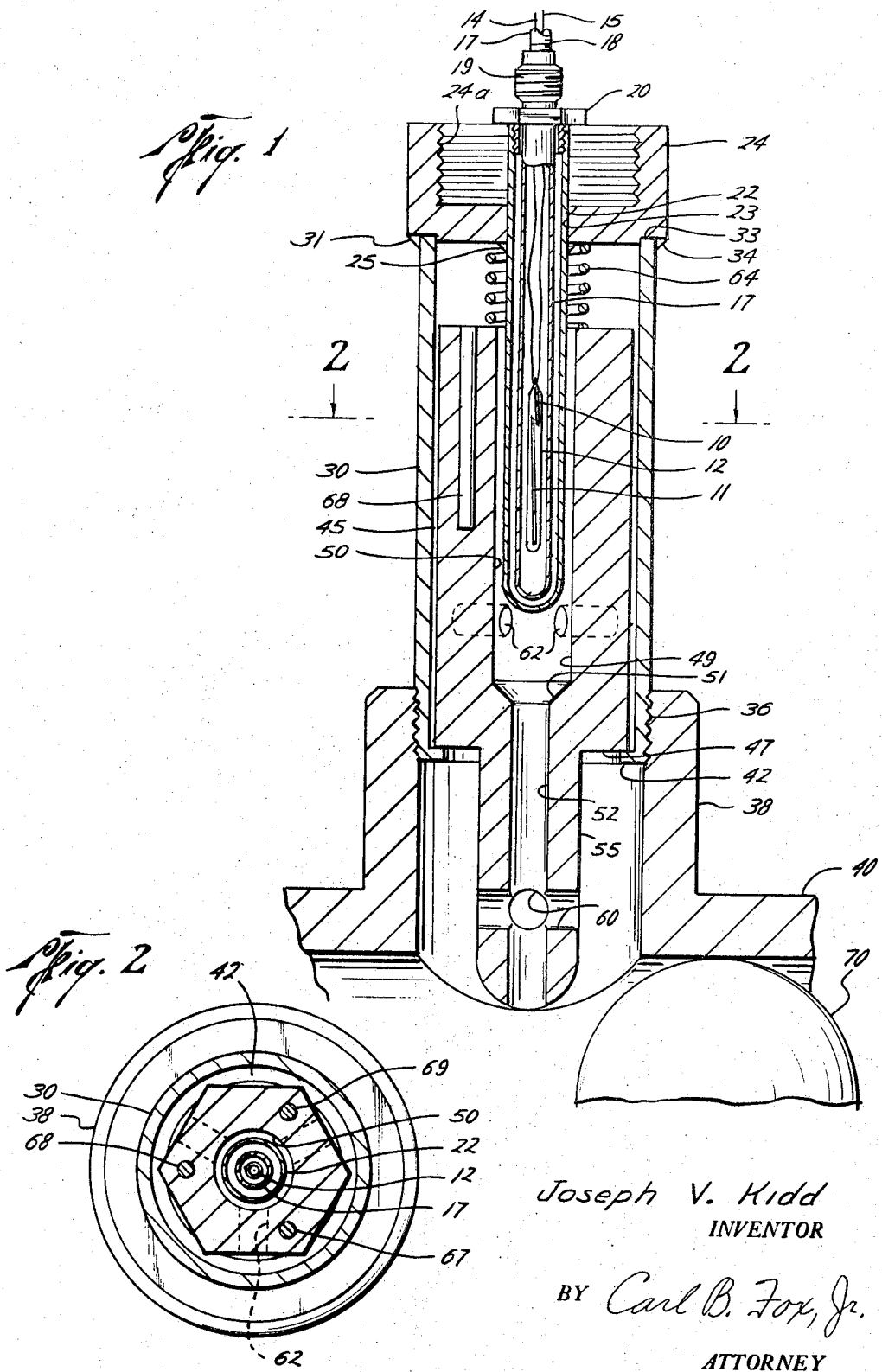

3,421,124
DETECTOR SWITCH
Joseph V. Kidd, 725 International Blvd.,
Houston, Tex. 77024
Filed Mar. 17, 1967, Ser. No. 624,045
U.S. Cl. 335—205                                               6 Claims
Int. Cl. H01h 9/00

ABSTRACT OF THE DISCLOSURE

The disclosure is of a novel detector switch, useful for indicating the passage or presence of an object coming into contact with the switch. The detector utilizes magnetic forces to open and close the switch contacts.

Background of the invention

*Field of the invention.*—The field of the invention is detector switches. The switch according to this invention is actuated by contact of an object with a probe or contact portion of the switch, which indicates such contact. A principal use of the invention falls in the art wherein ball or pig separators are used in pipelines for separating fluids flowing through the pipelines, the switch indicating the passage of the balls or pigs past the detector switch. The switch may be used in many other applications.

*Summary of the invention.*—The invention pertains to detector switches which, as well as having other uses which will become apparent, are useful for the detection of the presence or passage of objects which contact the switch. The switch is actuated by contact of an object with a probe portion of the switch. Such contact moves an element of the switch assembly which carries magnets which are moved with respect to the position of a switch, e.g., a reed switch having one or more flexible contacts moved by induced magnetic force. Since all other portions of the apparatus are made of nonmagnetic materials, the magnet movements act only on the switch to cause it to open or close. A primary problem solved by the invention is the provision of such a detector switch which may be replaced while the assembly is connected to a pipeline carrying fluid under pressure, the switch portion of the apparatus being exterior of and separated from the fluid in the pipeline, the probe portion extending into the pipeline to be contacted by the ball or pig. Provision is also made whereby changes in pressure in the pipeline do not affect or actuate the switch, so that the switch may be employed with various and changing fluid pressures in a pipeline or in other equipment.

Brief description of the drawings

FIG. 1 is an axial cross sectional view of a preferred embodiment of apparatus according to the invention.

FIG. 2 is a transverse section taken at line 2—2 of FIG. 1.

Description of preferred embodiments

Referring now to the drawings in detail, a reed switch having two contact elements or reeds 10, 11, at least reed 11 being flexible and adapted to be moved against reed 10 by induced magnetism, is sealed within an elongate cylindrical housing, usually glass, referred to by reference numeral 12. Each of the electrical conductors 14, 15 is connected to one of the switch elements 10, 11, and the conductors, or wires, extend upwardly, as shown in the drawing, from the switch to the exterior of cylindrical body 17. Body 17 is elongate and hollow and is made of a nonmagnetic material such as stainless steel, plastic, or any other suitable nonmagnetic substance. Body 17, around switch 12, is filled with resin 17a, or the like, so that the switch is connected and held firmly in place.

Body 17 has helical length indication marks 18 along its length to indicate its longitudinal position with respect to locking adjusting nut 19 which is screwed into fitting 20 carried at the upper end of another elongate cylindrical body or housing 22. The length indication marks may take any suitable form, and are used to control the degree of insertion of tube 17, and the reed switch into tubular housing 22.

Housing 22 is welded in position through an opening 23 of inverted cap element 24. The weld is shown at 25, but the weld if preferred may be at the upper side of the lower web of the cap, or other means of sealingly and permanently fastening of housing 22 through opening 23 may be employed. Cap 24 has threaded socket 24a to receive a conduit, or the like, for enclosing and shielding conductors 14, 15.

An elongate tubular housing sleeve 30 is welded around its upper end at 31 within a notch or relief 33 surrounding the lower periphery of cap 24, the weld being indicated by reference numeral 34. The lower end of housing sleeve 30 is externally threaded at 36 and is screwed into the threads of a lateral outlet nipple 38 at the side of a pipe or pipeline, or the like, the pipe being indicated by reference numeral 40.

Housing sleeve 30 has an inwardly projecting annular shoulder 42 within the lower end thereof. A body 45 is disposed within housing sleeve 30, fairly loosely fitted. Body 45 is shown to be of hexagonal external cross sectional configuration, but may have any form, preferably rotationally balanced, which permits passage of fluids around the outside of body 45 within the interior chamber of sleeve housing 30. For example, body 45 may be cylindrical with longitudinal grooves along its sides, or may be of other polygonal cross section than hexagonal. It is preferred that room for adequate fluid flow around body 45 in housing 30 be provided so that pressure surges occurring within pipe 40 will be dissipated by flow around body 45 so that significant movements of body 45 will not occur because of such pressure surges, to cause false indications by actuation of switch 12. Body 45 is retained within sleeve housing 30 by shoulder 42 abutting the lower end 47 of body 45.

Body 45 has an elongated passageway 49 therethrough which has circular transverse cross sections, the size of passage 49 being somewhat larger at its upper portion 50 and conically reducing at 51 to a smaller size 52 at its lower end. Below shoulder 47, body 45 is of smaller cylindrical configuration at its portion 55. The lower end of body portion 55, the plunger, is preferably rounded at its lower edge as indicated at 56, so that objects moving through pipe 40 will not hang thereon. When body 45 is in a position whereby shoulders 42, 47 are in contact, the lower end of portion 55 extends into the pipeline bore preferably by a small distance, ¼ inch to about ¾ inch being the preferred range, the usual projection into the line being made about ½ inch.

Transverse passageways 60 intersecting passage 52 are provided through body portion 55 as pressure equalizing liquid or gas bleed ports. Four of these transverse passages are shown, but any number may be employed.

Additional pressure equalizing liquid or gas bleed ports 62 are provided through passage portion 50 above conical shoulder 51. These permit ingress and egress of fluids from passage 49 to the exterior of body 45 in order that pressure fluctuation in pipe 40 does not have a tendency to move or displace body 45 in the chamber of sleeve housing 30.

A helical compression spring 64 is engaged between the upper end of body 45 and the lower surface of cap 24. This spring biases body 45 to contact with shoulder 42. The spring is strong enough to overcome the weight of body 45 so that body 45 remains in its extended position unless the lower end of body portion 55 is contacted by an object with sufficient force to push body 45 upwardly to overcome spring 64.

Elongate permanent magnets 67-69 are disposed in three equally circularly spaced bores parallel to passage 49 into the upper end of body 45. The magnets are firmly fixed in place in the bores, either by fitting them into the bores tightly enough so that they remain in place or by use of some adherent material such as cement or glue, the latter construction being preferred in order to avoid the necessity of driving the magnets into the bores. The magnets 67, 68, 69 are disposed with like poles up and like poles down, in other words, all north poles are up and south poles down, or vice versa.

The contact element 10, 11 of reed switch 12 are of material in which magnetism is induced by a magnetic field and the contacts are moved to open or to close by longitudinal movements of the magnets 67, 68, 69. The apparatus may be designed so that upon upward movement of body 45 and magnets 67, 68, 69 by depression of the plunger, the contacts will be either closed or opened as a result of the change in the magnetic field at the contacts.

As stated, the opening and closing of contacts 10, 11 depends on magnetism induced in the contacts, also commonly referred to as reeds or vanes, due to the position of magnets 67, 68, 69. Each of the contacts is made of a material of low permeability, such as soft iron. A magnetic field induces each contact to become magnetic, i.e., a magnet, the polarities of each magnet being the same with respect to the upper and lower ends thereof. Therefore, if the lower end of contact 10 is "north," the lower end of contact 11 is "north"; the upper ends of contacts 10, 11 being "south"; and vice versa. Thus, "north"-"south" or "south"-"north" of the contacts are adjacent for mutual closing attraction when the contacts are under the influence of a magnetic field of sufficient strength. Movements of body 45 with respect to the switch position changes the magnetic field at the switch, so that the switch contacts are either sufficiently magnetically mutually attracted to close, or not sufficiently so attracted. Switch 12 may be normally "open" or normally "closed." If normally "open," the magnetic field at the switch will be insufficient to cause closing of the switch when body 45 is in its lowermost position, and sufficient to cause closing when body 45 is at an elevated, or depressed, position. If normally "closed," the magnetic field at the switch will be sufficient to maintain closing of the switch when body 45 is in its lowermost position, and insufficient to cause closing when body 45 is at an elevated, or depressed, position.

The reed switch may be a single-pole, multiple-pole, or other form of switch.

When the detector switch is employed to detect objects, such as spheres, balls, pigs, or the like, moving through a pipeline, for example the ball 70 indicated in FIG. 1, the object will, upon striking the lower end of body portion 55, moved body 45 upwardly within sleeve housing 30 against the pressure of spring 64 so that magnets 67, 68, 69 are moved upwardly with relation to the reed switch. This movement changes the magnetic field at the reed switch and actuates the switch. After the object in the pipeline has moved past body portion 55 so that spring 64 may cause return downward movement of body 45 (sometimes, the weight of body 45 causes this movement), then the magnetic field in the area of the reed switch returns to normal and the switch is actuated oppositely.

It will be noted that fluid pressures within pipe 40 and sleeve housing 30 do not enter body 22. Tube 17 containing switch 12 may, therefore, be removed and replaced with the line under pressure.

At lower pressures, sleeve housing 30 may not become entirely filled with fluid from the pipeline, but at higher pressures the gas, e.g., air or other gas, within sleeve housing 30 will be dissolved in the liquid or gas contained in the pipeline which enters sleeve 30 so that the interior of the apparatus will become completely filled with the fluid from the line, whether it be gas or liquid. The movements of body 45 when contacted by objects moving through the line will probably in most cases eventually result in sufficient pumping action to cause complete filling of sleeve housing 30 with line fluid regardless of pressure.

As has been previously indicated, all of the apparatus is made of nonmagnetic materials except for the magnets themselves and the reed switch elements. This is necessary in order to avoid interference with the magnetic field at the reed switch. Any nonmagnetic materials may be used for the components of the apparatus other than the magnets 67, 68, 69 and the switch contacts 10, 11. Stainless steels and other nonmetallic materials and alloys, plastics, and any other nonmagnetic materials may be used for these components of the apparatus.

By unscrewing nut 19, the tube 17 containing the reed switch and leads may be completely removed without necessity for relieving pressure within pipe 40. The switch and its housing may be replaced or reinserted, or moved to change the extent of longitudinal insertion of tube 17, by use of the calibrations 18.

When the apparatus is disposed in the position indicated in the drawings, that is, with cap 24 up, then spring 64 is not necessary. The weight of body 45 will cause its return to the lower position. However when the apparatus, is located in some other position, angular, horizontal, or downwardly directed, the spring 64 may be necessary.

While preferred embodiments of the invention have been shown and described, many modifications thereof may be made by a person skilled in the art without departing from the spirit of the invention, and it is intended to protect by Letters Patent all forms of the invention falling within the scope of the following claims.

I claim:
1. Detector switch, comprising housing means having a probe opening at an end thereof, said housing means including sealed well means therein opening from the exterior of said housing means, body means disposed within said housing means for movements toward and away from said probe opening, said body means having a passage therethrough and said well means extending freely into said body means passage, said body means including probe means extending freely through said probe opening to the exterior of said housing means, magnet means carried by said body means, switch means disposed within said well means in a position for actuation by change in magnetic field upon movement of said body means upon movement of said probe means by an object exterior of said housing means, said magnet means being disposed at a portion of said body means surrounding said body means passage means and said well means.

2. Combination of claim 1, said magnet means comprising three bar magnets disposed in openings of said body means, said switch means comprising reed switch means.

3. Combination of claim 2, said body means having side relief means providing fluid communications past said body means within said housing means, said body means passage means also providing fluid communications past said body means within said housing means, said body means having plural transverse passage means from said first-named passage means to the exterior of said body means, whereby pressure surges adjacent said probe means and said housing means opening are dissipated through said relief means and said body means passage means and transverse passage means whereby movements of said body means are not caused by said pressure surges.

4. Combination of claim 3, said housing means having a cylindrical chamber therewithin in which said body means is disposed, said body means being of polygonal cross section over its portion within said housing chamber and said extending probe means portion thereof being cylindrical, said body means passage means extending axially through said body means including said probe means portion thereof.

5. Combination of claim 4, said polygonal cross section being hexagonal cross section.

6. Combination of claim 4, said reed switch means comprising plural engageable contact means of low permeability, in which temporary magnetism is induced and withdrawn by movements of said magnet means, whereby said contacts are caused either to be open or closed depending on the longitudinal position of said magnet means relative said switch.

References Cited

UNITED STATES PATENTS

| | | | |
|---|---|---|---|
| 2,210,480 | 8/1940 | Brice | 73—392.2 |
| 2,310,504 | 2/1943 | Aubert. | |
| 2,667,631 | 1/1954 | Schaurte | 200—61.41 XR |
| 2,892,051 | 6/1959 | Moore | 335—205 XR |
| 3,271,708 | 9/1966 | McCormick | 335—205 |

ROBERT K. SCHAEFER, *Primary Examiner.*

H. BURKS, *Assistant Examiner.*

U.S. Cl. X.R.

200—61.41, 81.9